United States Patent [19]

Nakazato et al.

[11] Patent Number: 4,533,218

[45] Date of Patent: Aug. 6, 1985

[54] ZOOM LENS OPERATING MECHANISMS

[75] Inventors: Kunio Nakazato, Machida; Kazuya Ozawa, Tokyo, both of Japan

[73] Assignee: Sony Corporation, Tokyo, Japan

[21] Appl. No.: 518,135

[22] Filed: Jul. 28, 1983

[30] Foreign Application Priority Data

Jul. 30, 1982 [JP] Japan .................................. 57-133209

[51] Int. Cl.³ .................................................. G02B 7/04
[52] U.S. Cl. ........................................ 350/430; 350/255
[58] Field of Search ........................................... 350/430

[56] References Cited

U.S. PATENT DOCUMENTS 3,784,285  1/1974  Watanabe et al. ................... 350/430
4,099,847  7/1978  Ito ....................................... 350/430

Primary Examiner—John K. Corbin
Assistant Examiner—Loha Ben
Attorney, Agent, or Firm—Lewis H. Eslinger; Alvin Sinderbrand

[57] ABSTRACT

A zoom lens operating mechanism comprises a stationary cylinder, an operating ring rotatably mounted on the stationary cylinder, a cam cylinder rotatably mounted within the stationary cylinder and coupled to the operating ring for rotation therewith, at least one lens group coupled to the cam cylinder so as to be movable within a zoom range as the operating ring is rotated within a first angular range and within a close-up range as the operating ring is rotated within a second angular range, a guide arrangement formed in the stationary cylinder, and an operating member mounted on the operating ring and cooperating with the guide arrangement to define the first and second angular ranges. The guide arrangement comprises contiguous first and second guide grooves with a stop at the junction therebetween, and the operating member is rotatable relative to the operating ring and includes a locking device extendable into the first and second guide grooves such that upon rotation of the operating ring by the operating member through the first range, the locking device moves along the first guide groove and is locked at the stop, and upon rotation of the operating member the locking device is released from the stop and the locking device can then move along the second guide groove so that the operating ring is rotatable within the second range.

8 Claims, 17 Drawing Figures

FIG.14
FIG.15
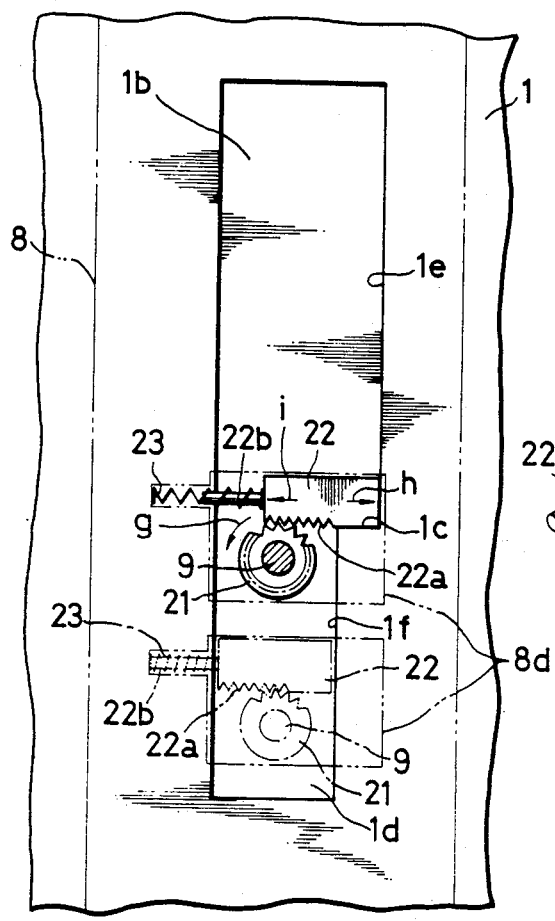
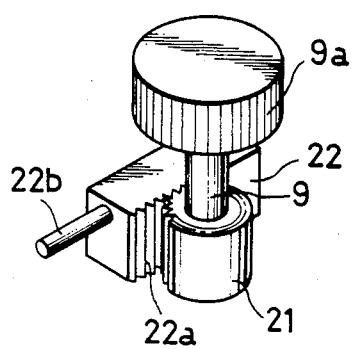

ZOOM LENS OPERATING MECHANISMS

BACKGROUND OF THE INVENTION

1. Field of the Invention

This invention relates to zoom lens operating mechanisms for a zoom lens of a camera, such as a video or a still or movie photographic camera, and, more particularly, to an operating mechanism for a zoom lens to provide a focusing effect which varies continuously between a zoom effect and a close-up effect.

2. Description of the Prior Art

An operating mechanism for a zoom lens and which provides a focusing effect which varies continuously between a zoom effect and a close-up effect is known, and will now be described with reference to FIGS. 1 to 3 of the accompanying drawings.

In the known operating mechanism a plurality of guide rods 2 are arranged inside a stationary cylinder 1. A holding member 5 holding a variable lens group 3 (which may be a single lens) and another holding member 6 holding a correction lens group 4 (which may be a single lens) are mounted on the guide rods 2 such that the holding members 5 and 6 are both slidable in the direction indicated by arrows a and b.

A cam cylinder 7 is rotatably mounted inside the stationary cylinder 1. Two cam grooves 7a and 7b are formed in the inner wall of the cam cylinder 7, and FIG. 3 shows a developed view of a part of the cam cylinder 7 including the cam grooves 7a and 7b. A pin 5a formed on the holding member 5 is received in the cam groove 7a, and a pin 6a formed on the holding member 6 is received in the cam groove 7b.

An operating ring 8 is rotatably mounted on the outside of the stationary cylinder 1. A pin 7c extends radially outward from the cam cylinder 7 and engages with a recess 8a formed in the inner surface of the operating ring 8 through an elongated circumferential guide slot 1a formed in the stationary cylinder 1. When the operating ring 8 is rotated, the pin 7c moves along with the elongated guide slot 1a, and so the cam cylinder 7 is rotated with the operating ring 8.

An integral cylindrical portion 8b extends radially outward from the operating ring 8, and a pin-like operating member 9 having an end button 9a is disposed to extend through the cylindrical portion 8b of the operating ring 8. The operating member 9 is biased by a spring 10 in the radially inward direction as indicated by an arrow c.

A guide groove 1b is formed on the outer surface of the stationary cylinder 1 to extend circumferentially over a predetermined angle $\alpha$ as shown in FIG. 2. The inner end of the operating member 9 which is biased inward in the manner described above fits into the guide groove 1b.

A rotatable cylinder 12 holds a focusing lens 11 at the front end of the zoom lens, and a stationary cylinder 14 holds a relay lens 13 at the rear end of the zoom lens. A calibrated ring 15 is fixed on the stationary cylinder 1 and cooperates with a mark or marks on the rotatable cylinder 12.

With the operating mechanism described above, when the operating ring 8 is rotated to rotate the cam cylinder 7, the pins 5a and 6a of the holding members 5 and 6 move within the grooves 7a and 7b, respectively. Thus, the holding members 5 and 6 move along the guide rods 2 in the directions indicated by the arrows a and b so as to move the lens groups 3 and 4, respectively.

The displacement of the lens groups 3 and 4 is normally limited to a distance corresponding to the rotation of the operating ring 8 through the angle $\alpha$, that is, to an extent corresponding to the allowable movement of the operating member 9 along the guide groove 1b. Zoom photography may be performed within this angular range.

Additionally, however, the button 9a can be pulled in the direction indicated by an arrow d against the biasing force of the spring 10 when at the terminal end position for zoom photography where the operating member 9 abuts against the end of the guide groove 1b, whereupon the operating member 9 is disengaged from the guide groove 1b. The operating ring 8 can then be further rotated in the clockwise direction in FIG. 2 from this position. This further clockwise rotational movement of the operating ring 8 extends through another predetermined angle $\beta$, and within this angular range close-up photography may be performed.

When the operating ring 8 is rotated in the reverse direction for changing from the close-up mode to the zoom mode, the operating member 9 is automatically biased by the spring 10 in the direction indicated by the arrow c in FIG. 1 or 2, so that the inner end of the operating member 9 reenters the guide groove 1b at the transition to the zoom mode.

With this operating mechanism, the change from the zoom mode to the close-up mode is made merely by continuously rotating the operating ring 8. However, the change from the zoom mode to the close-up mode is marked by the temporary locking of the operating ring 8 and the need to pull out the operating member 9, so an unintentional change will not be made.

This need to pull the operating member 9 does, however, lead to a problem, particularly in the case of video and movie cameras, and this is that the necessary pull tends to transmit a vibration or displacement to the camera, and the user must try to counter this by holding the camera steady with one hand while pulling the operating member 9 with the other hand.

Moreover, it may be necessary to move the fingers on the operating member 9 so as to grasp the button 9a when the mode is to be changed from the zoom mode to the close-up mode, and this makes the operation a little awkward.

In another known operating mechanism a button 9a is depressed for changing the mode, but this is less satisfactory due to the possibility of accidental depression.

In yet another known operating mechanism an operating ring 8 is temporarily rotated in the reverse direction during the change from the zoom mode to the close-up mode, but this is rather a complex mechanism.

SUMMARY OF THE INVENTION

One object of the present invention is to provide an improved zoom lens operating mechanism with which a change from a zoom mode to a close-up mode can be made more readily.

Another object of the present invention is to provide a zoom lens operating mechanism having an operating ring which can move smoothly and continuously in one direction without temporary reverse rotation at a transition between a zoom mode range and a close-up mode range.

According to the present invention there is provided a zoom lens operating mechanism comprising:

a stationary cylinder;

an operating ring rotatably mounted on said stationary cylinder;

a cam cylinder rotatably mounted within said stationary cylinder and coupled to said operating ring for rotation with said operating ring;

at least one lens group coupled to said cam cylinder so as to be movable within a zoom range as said operating ring is rotated within a first angular range and within a close-up range as said operating ring is rotated within a second angular range;

guide means formed in said stationary cylinder; and an operating member mounted on said operating ring and cooperating with said guide means to define said first and second angular ranges which are separated by a stop;

wherein:

said guide means comprises contiguous first and second guide grooves with a stop at the junction between said first and second guide grooves; and said operating member is rotatable relative to said operating ring and includes locking means extendable into said first and second guide grooves such that upon rotation of said operating ring by said operating member through said first range, said locking means moves along said first guide groove and is locked at said stop, and upon rotation of said operating member said locking means is released from said stop and said locking means can then move along said second guide groove so that said operating ring is rotatable within said second range.

The above, and other objects, features and advantages of the invention, will be apparent in the following detailed description of illustrative embodiments of the invention which is to be read in connection with the accompanying drawings, wherein the same reference numerals are used to identify the same parts in the several views.

BRIEF DESCRIPTION OF THE DRAWINGS

FIGS. 1 to 3 show a known operating mechanism, in which:

FIG. 1 is a side sectional view of the operating mechanism;

FIG. 2 is a diametric sectional view;

FIG. 3 is a developed view of part of a cam cylinder shown in FIG. 1; and

FIGS. 4 to 17 show embodiments of the present invention, in which:

FIG. 4 is a side sectional view of a first embodiment of operating mechanism according to the invention;

FIG. 5 is a view showing part of the mechanism of FIG. 4 for explaining the operation;

FIG. 6 is a perspective view of part of the mechanism of FIG. 4;

FIG. 7 is a plan view of part of a second embodiment of operating mechanism according to the invention;

FIG. 8 is a perspective view of part of the mechanism of FIG. 7;

FIGS. 9 and 10 are longitudinal sectional views of part of the embodiment of FIG. 7 in different operating conditions;

FIG. 11 is a sectional view along the line XI—XI in FIG. 9;

FIG. 12 is a plan view showing part of a third embodiment of operating mechanism according to the invention;

FIG. 13 is a perspective view of part of the mechanism of FIG. 12;

FIG. 14 is a plan view of part of a fourth embodiment of operating mechanism according to the invention;

FIG. 15 is a perspective view of part of the mechanism of FIG. 14;

FIG. 16 is a plan view of part of a fifth embodiment of operating mechanism according to the invention; and FIG. 17 is a perspective view of part of the mechanism of FIG. 16.

DETAILED DESCRIPTION OF THE PREFERRED EMBODIMENTS

Figure 1:
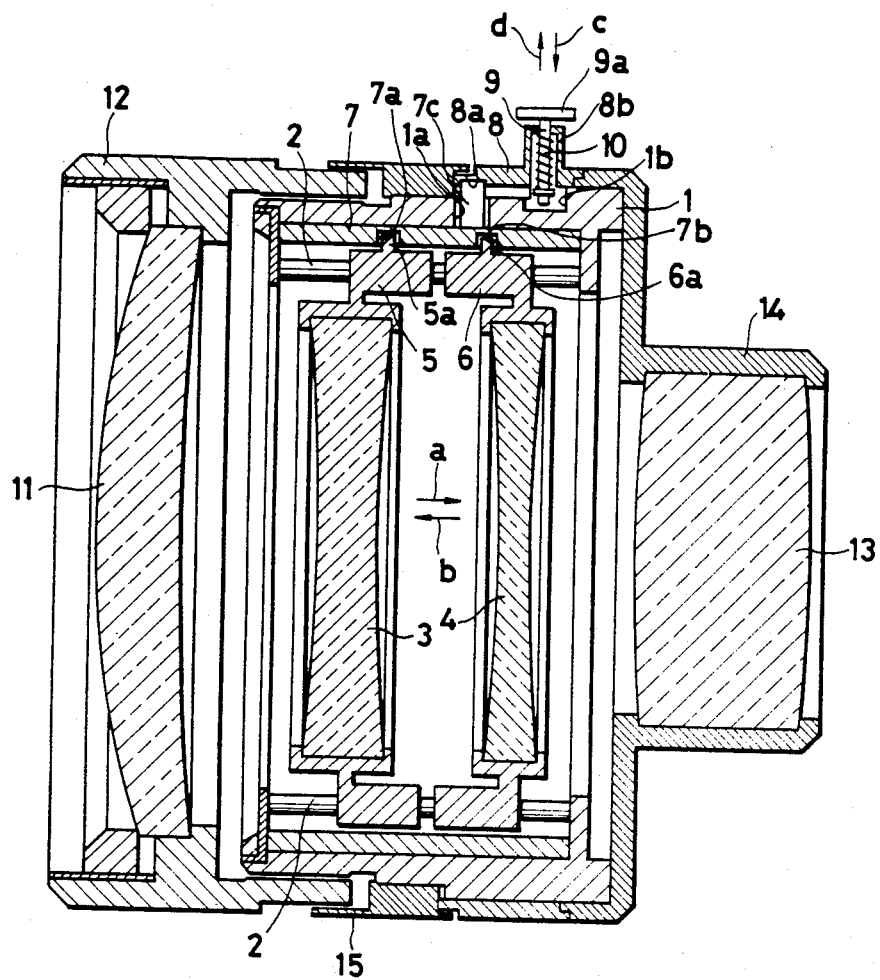
Figure 2:
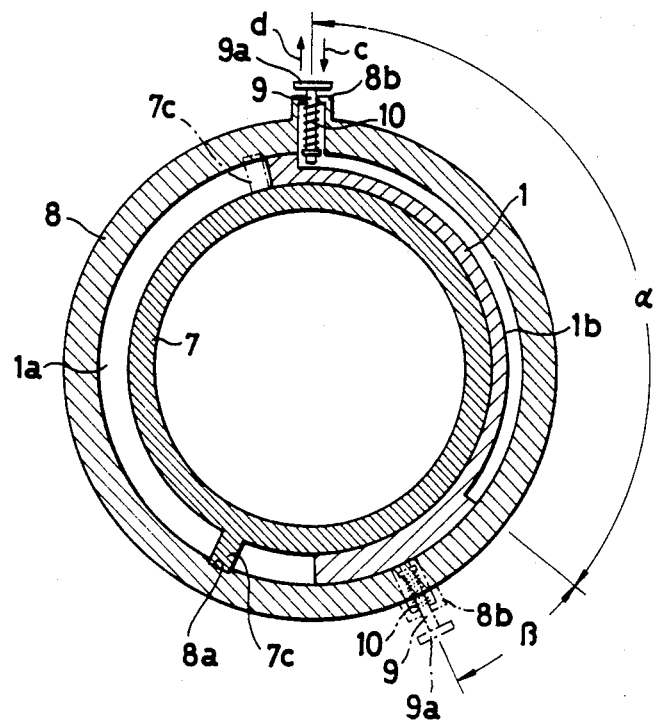
Figure 3:
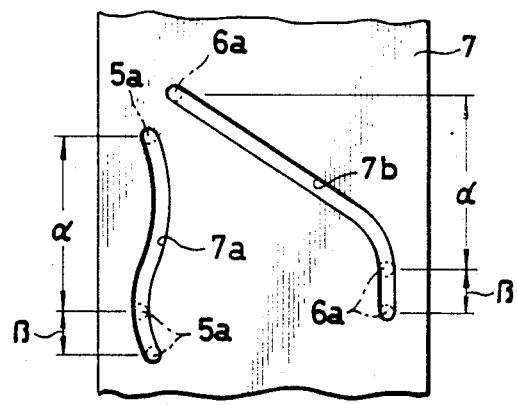
Figure 4:
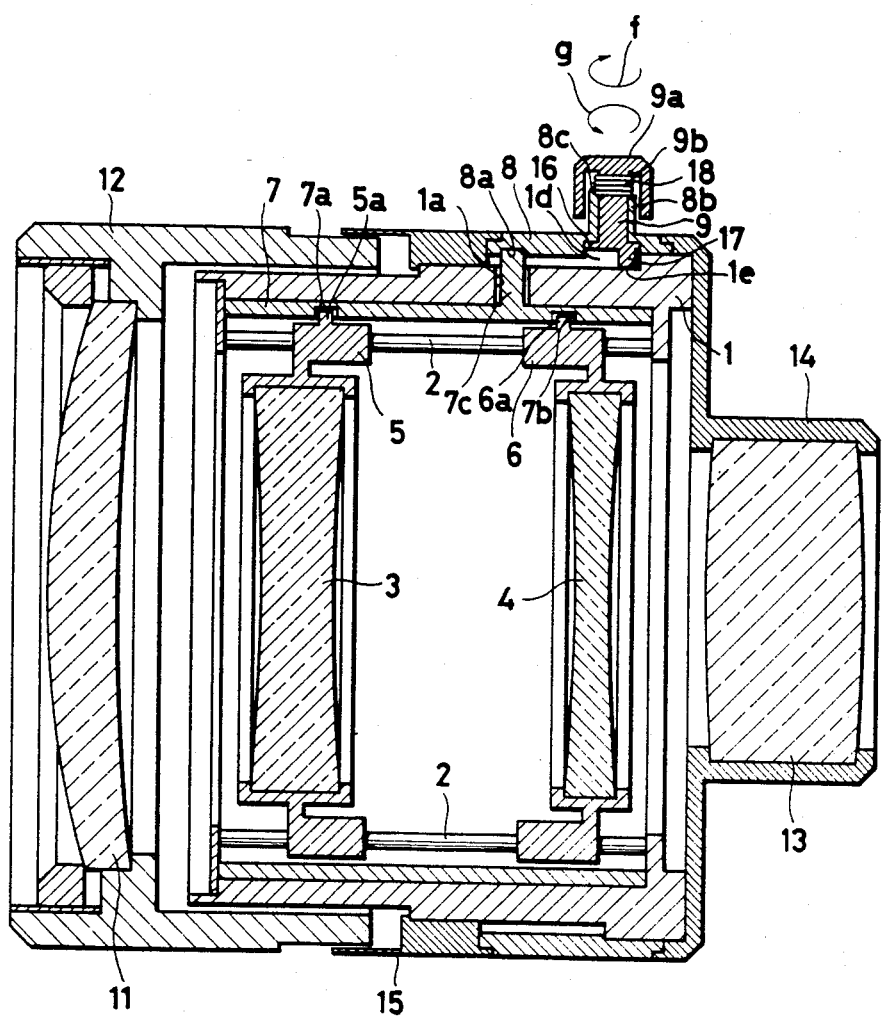
Figure 5:
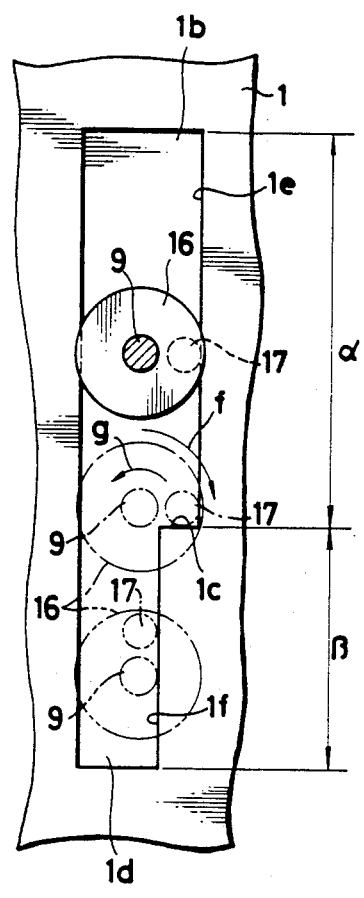
Figure 6:
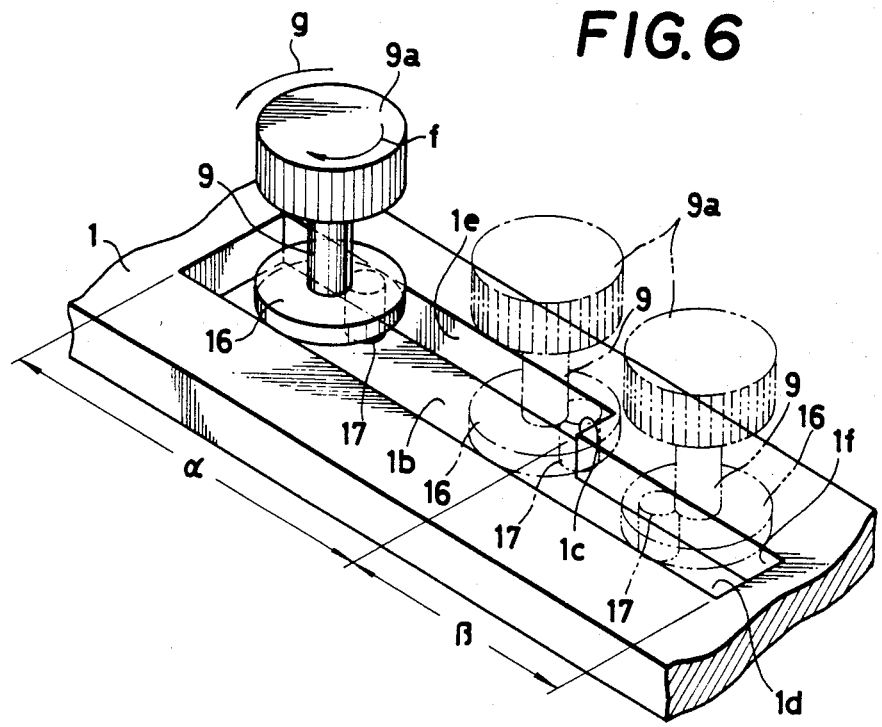
Figure 8:
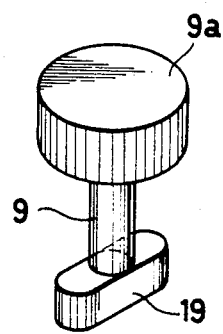

FIGS. 4 to 6 show the first embodiment of the invention, and the same reference numerals in FIGS. 4 to 6 denote the same parts as in FIGS. 1 to 3. In the first embodiment, contiguous wide and narrow guide grooves $1b$ and $1d$ are respectively formed in correspondence with the first and second predetermined angular ranges $\alpha$ and $\beta$.

For the sake of simplicity, FIGS. 5 and 6 show a developed model view and a perspective model view, respectively, of a part of a stationary cylinder 1 which has the guide grooves $1b$ and $1d$. A locking means 17 movable along the guide grooves $1b$ and $1d$ as shown in three different positions indicated by a solid line, an alternate long and short dashed line, and an alternate long and two short dashed line, respectively.

Referring to FIGS. 4 to 6, a disc-shaped switching member 16 is formed at the lower portion of an operating member 9 having a button $9a$ at its outer end. The locking means 17, which is of a pin-like shape, is formed to extend radially inward from the inner surface of the switching member 16 at an eccentric position. The operating member 9 is rotationally biased by a spring 18 in the direction indicated by an arrow f, so that the locking means 17 may occupy the position indicated by a dotted line, when the switching member 16 is in the state indicated by the solid line. The two ends of the spring 18 are respectively mounted on a projection $9b$ formed on the button $9a$, and a projection $8c$ formed on a cylindrical portion $8b$.

With this first embodiment of operating mechanism, when the operating ring 8 is rotated through the first range $\alpha$ corresponding to the zoom mode, the locking means 17 (as indicated by the solid line) moves along a guide wall $1e$ of the guide groove $1b$. When the locking means 17 comes to the position indicated by the alternate long and short dashed line, it abuts against and is stopped by a stop $1c$ formed by a step or shoulder formed at the junction between the wide guide groove $1b$ and the narrow guide groove $1d$.

When the button $9a$ is rotated through about 90° against the biasing force of the spring 18 in this state, the locking means 17 is disengaged from the stop $1c$ and is released from the locked state. Then, the locking means 17 is movable along a guide wall $1f$ of the narrow guide groove $1d$ as indicated by the alternate long and two short dashed line. Accordingly, the operating ring 8 is movable within the second range $\beta$ corresponding to the close-up mode.

To change from the close-up mode to the zoom mode, the operating ring 8 is rotated in the reverse direction, and the operating member $9a$ is automatically rotated in the direction indicated by an arrow f merely by the force of the spring 18 at the position of the stop $1c$, so that the locking means 17 again abuts against the stop $1c$.

As may be seen from the above description, the guide grooves 1b and 1d must have the guide walls 1e and 1f and the stop 1c of the necessary predetermined shapes and dimensions. However, the shapes and dimensions of the guide grooves 1b and 1d at their left-hand sides as viewed in FIG. 5 are not particularly critical.

FIGS. 7 to 11 show the second embodiment, in which an operating member 9 has at its radially inner end a locking means 19 having a rectangular shape with rounded corners.

Figure 7:
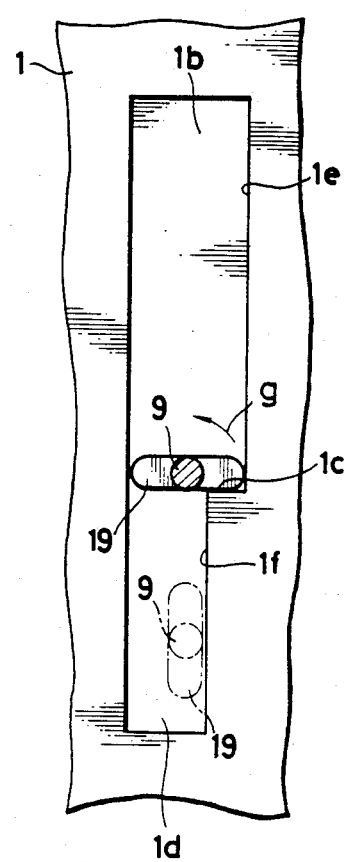

When the locking means 19 is in the condition shown by the solid line in FIG. 7, it is stopped by a stop 1c. However, when a button 9a has been rotated in the direction indicated by an arrow g, the locking means 19 is in the condition shown by the alternate long and short dashed line, and so it is movable along the guide wall 1f of the guide groove 1d.

Figure 9:
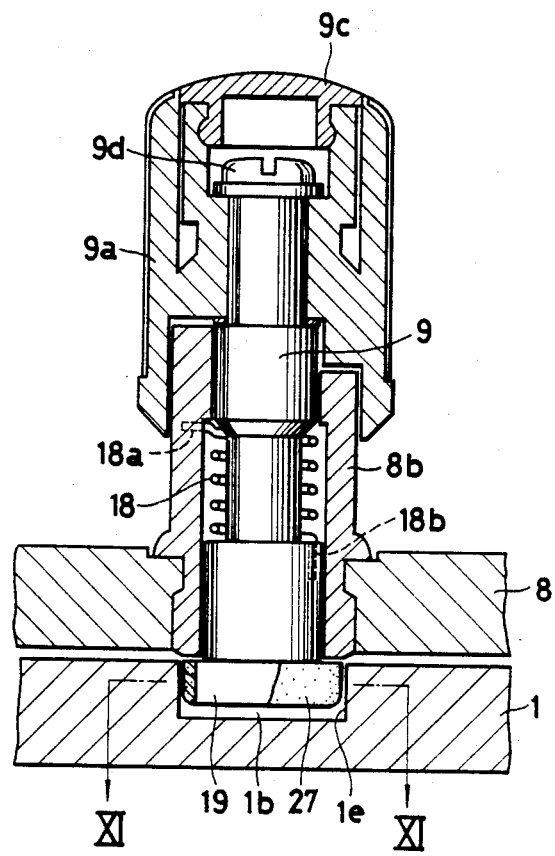
Figure 10:
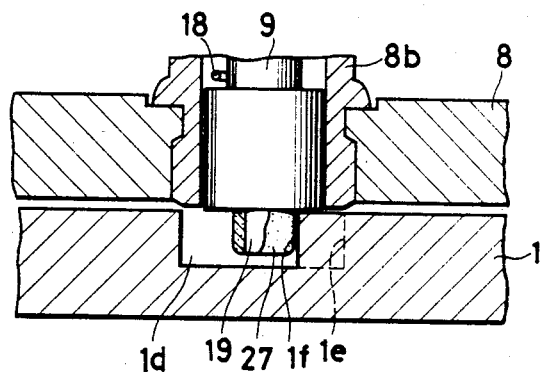

FIG. 9 shows an operating control means of the operating ring 8, which comprises the locking means 19. A hollow cylindrical portion 8b is fixed to the operating ring 8 and extends radially outwardly therefrom. A cylindrical operating member 9 having a circular cross-section is fitted inside the bore of the cylindrical portion 8b. One end 18a of a coil spring 18 is mounted on the cylindrical portion 8b, and the other end 18b thereof is mounted on the operating member 9.

The operating member 9 is normally biased clockwise as viewed in FIG. 7 by the spring 18 and a stop (not shown) interposed between the operating member 9 and the cylindrical portion 8b. As indicated by the solid line in FIG. 9, the locking means 19 at the inner end of the operating member 9 is oriented as indicated by a solid line in FIG. 11 unless an external force is applied thereto.

A button 9a is fixed onto the outer end of the operating member 9 by means of a screw 9d. A cap 9c is mounted over the top of the screw 9d.

Figure 11:
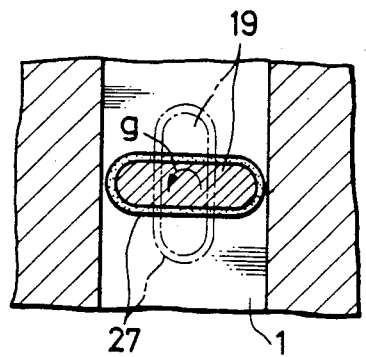

When the locking means 19 as indicated by the solid line in FIG. 7 is rotatably moved by the button 9a in the direction indicated by an arrow g against the biasing force of the spring 18, the locking means 19 is changed from the condition shown by the solid line to the condition shown by the alternate long and short dashed line in FIG. 11. A rubber ring 27 for providing a damping effect is fitted around the locking means 19. In other respects the second embodiment may be similar to the first embodiment.

Figure 12:
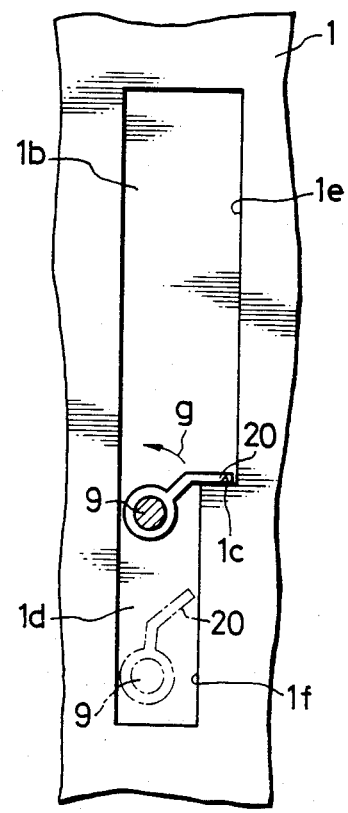
Figure 13:
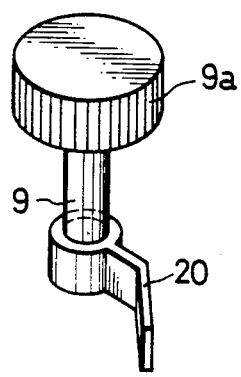

FIGS. 12 and 13 show the third embodiment, in which a locking means 20 of a bent pawl-like shape is arranged at the radially inner portion of an operating member 9.

FIG. 12 shows the condition wherein the locking means 20 is stopped by a stop 1c, and also shows the locking means 20 indicated by the alternate long and short dashed line in the condition where it is located at a position along a guide groove 1d. In other respects the third embodiment may be similar to the first embodiment.

FIGS. 14 and 15 show a fourth embodiment, in which a pinion 21 is arranged at the radially inner portion of an operating member 9 and meshes with a rack 22a formed in a locking means 22. A recess 8d is formed in an operating ring 8, as indicated by the alternate two long and short dashed line in FIG. 14, and the pinion 21 and the locking means 22 are housed in the recess 8d. A guide portion is formed in the recess 8d to guide a pin 22b projecting from the locking means 22. A compression spring 23 embraces the pin 22b such that the locking means 22 is normally biased to the right as viewed in FIG. 14.

When the button 9a is rotated in the direction indicated by an arrow g from the condition shown in FIG. 14, the locking means 22 is moved in the direction indicated by an arrow i against the biasing force of the compression spring 23. Thus, the operating ring 8 may be operated to change from the zoom mode to the close-up mode.

FIG. 14 shows that the locking means 22 indicated by the solid line is in the state where it is stopped by the stop 1c, and that the locking means 22 indicated by the alternate long and short dashed line is in the condition where it is movable along the guide groove 1d. In this embodiment, the guide grooves 1b and 1d are wider than those of the previous embodiments. In other respects the fourth embodiment may be similar to the first embodiment.

Figure 16:
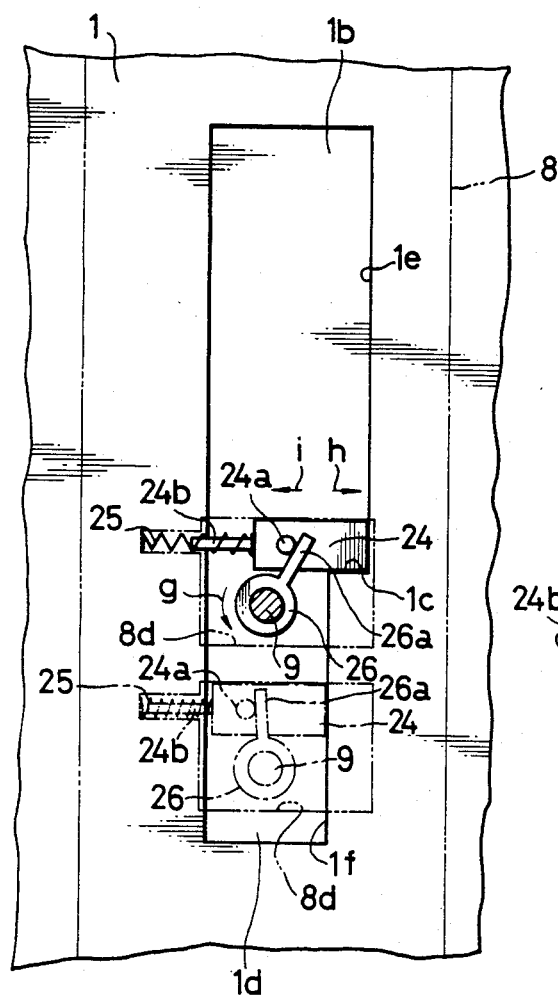
Figure 17:
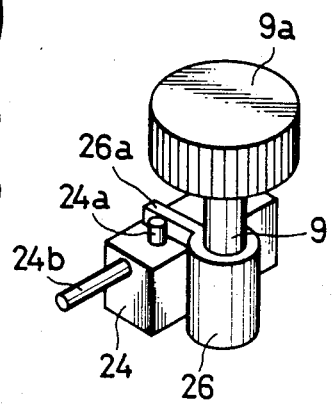

FIGS. 16 and 17 show the fifth embodiment, in which a locking means 24 with pins 24a and 24b is housed in a recess 8d and is biased by a spring 25 in the direction indicated by an arrow h.

A member 26 with a pawl 26a is mounted at the lower portion of the operating member 9 and is also housed in the recess 8d. The pawl 26a engages with the pin 24a. When the button 9a is rotated in the direction indicated by an arrow g, the pawl 26a urges the pin 24a in the direction indicated by an arrow i against the biasing force of the spring 25. Then, the locking state of the locking means 24 is released, and the operating ring 8 can be switched to the close-up mode.

FIG. 16 shows that the locking means 24 indicated by the solid line is in the condition where it is stopped by the stop 1c, and that the locking means 24 indicated by the alternate long and short dashed line is in the condition where it is movable along the guide groove 1d. In other respects the fifth embodiment may be similar to the first embodiment.

With the embodiments described above, the button needs only to be rotated in order to change from the zoom mode to the close-up mode. This operation can readily be performed without causing vibration or displacement of the camera on which the lens is mounted, and without needing to alter the finger grip. The operability of the embodiments is therefore significantly better than that of the known mechanisms.

Although illustrative embodiments of the invention have been described in detail herein with reference to the accompanying drawings, it is to be understood that the invention is not limited to such precise embodiments, and that various changes and modifications may be effected therein by one skilled in the art without departing from the scope or spirit of the invention as defined in the appended claims.

We claim:

1. A zoom lens operating mechanism comprising:
 a stationary cylinder;
 an operating ring mounted for rotation in respect to said stationary cylinder;
 a cam cylinder mounted for rotation in respect to said stationary cylinder and coupled to said operating ring for rotation with said operating ring;
 at least one lens group coupled to said cam cylinder for motion within a zoom range as said operating ring is rotated within a first angular range and for motion within a close-up range as said operating ring is rotated within a second angular range;

extended guide means formed in said stationary cylinder and having first and second contiguous lengths corresponding to said first and second angular ranges, respectively, and a stop portion between said contiguous lengths;

an operating manular member mounted on said operating ring for motion with the latter along said guide means and for rotation relative to said operating ring between first and second positions; and locking means movable along said guide means with said operating member and coupled to the latter to move between a locking position engageable with said stop portion and a released position free of said stop portion in response to rotation of said operating member to said first and second positions, respectively, whereby said operating member may be moved from said first length to said second length only when said operating member is rotated into said second position.

2. A mechanism according to claim 8 wherein said first guide groove is wider than said second guide groove and said stop portion is formed by a step at a junction between said first and second guide grooves; and wherein rotation of said operating member displaces said locking means to be movable past said step from said first guide groove into said second guide groove.

3. A mechanism according to claim 2 wherein guide walls of said first and second guide grooves are formed on an outer circumferential wall of said stationary cylinder.

4. A mechanism according to claim 2 wherein said locking means is formed integrally with said operating member, and is rotated upon rotation of said operating member.

5. A mechanism according to claim 2 wherein said locking means moves linearly upon rotation of said operating member, and said locking means and said stop portion engage with and disengage from each other upon said linear movement of said locking means.

6. A mechanism according to claim 4 wherein said operating ring has a radially extending cylindrical portion for supporting said operating member, and a spring is connected between said cylindrical portion and said operating member for rotationally biasing said operating member into said first position.

7. A mechanism according to claim 5 wherein a spring is connected between said operating ring and said locking means, and said locking means is biased by said spring such that said operating member is biased into said first position.

8. A mechanism according to claim 1, wherein said guide means includes first and second guide grooves corresponding to said first and second lengths, respectively, and said locking means is extendable into said first and second guide grooves for motion therealong.

* * * * *